(12) United States Patent
Moritz et al.

(10) Patent No.: US 8,639,803 B2
(45) Date of Patent: Jan. 28, 2014

(54) SYSTEMS AND METHOD FOR PREDICTING THE FUTURE LOCATION OF AN ENTITY

(75) Inventors: Simon Moritz, Solna (SE); Jonas Björk, Stockholm (SE); Christina Moritz, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 379 days.

(21) Appl. No.: 12/873,771

(22) Filed: Sep. 1, 2010

(65) Prior Publication Data

US 2012/0054337 A1 Mar. 1, 2012

(51) Int. Cl.
*G06F 15/16* (2006.01)
*G08G 1/123* (2006.01)

(52) U.S. Cl.
USPC ..................................... 709/224; 340/995.28

(58) Field of Classification Search
None
See application file for complete search history.

(56) References Cited

U.S. PATENT DOCUMENTS

| 6,590,507 | B2 * | 7/2003 | Burns | 340/995.13 |
|---|---|---|---|---|
| 2006/0085419 | A1 * | 4/2006 | Rosen | 707/9 |
| 2007/0030824 | A1 * | 2/2007 | Ribaudo et al. | 370/328 |
| 2008/0120308 | A1 * | 5/2008 | Martinez et al. | 707/100 |
| 2008/0140840 | A1 * | 6/2008 | Hamilton et al. | 709/226 |
| 2009/0054043 | A1 * | 2/2009 | Hamilton et al. | 455/414.2 |
| 2011/0045801 | A1 * | 2/2011 | Parker, II | 455/411 |

* cited by examiner

*Primary Examiner* — Scott Christensen
(74) *Attorney, Agent, or Firm* — Rothwell, Figg, Ernst & Manbeck, P.C.

(57) ABSTRACT

In one aspect, the invention provides a system that predicts the location of an entity, such as a friend of a user of a mobile device, and displays to the user this prediction information on a display screen of the mobile device. In some embodiments, the information may be displayed to the user in an augmented reality view (e.g., the prediction information may be displayed on top of an image as seen through a camera).

22 Claims, 6 Drawing Sheets

SYSTEMS AND METHOD FOR PREDICTING THE FUTURE LOCATION OF AN ENTITY

TECHNICAL FIELD

The invention relates to the field of predicting the future location of an entity.

BACKGROUND

Many of today's mobile applications (e.g., applications developed for mobile devices, such as mobile phones, personal digital assistants, the iPad from Apple, etc) allow users to access information from virtually anywhere. Several of these applications provide information to a user depending on the user's current location or the current location of people the user may know. For example, the Layar Reality Browser developed by Layar B.V., Rietlandpark 301, 1019 DW Amsterdam, The Netherlands ("Layar"), shows what is around a user by displaying real-time digital information on top of the real world as seen through the camera of the user's mobile device. Layar refers to this technology as "Augmented Reality" because the application augments the real world as seen through your mobile device's camera based on your location. The Layar application works by using a combination of the mobile device's camera, compass and GPS data to identify the user's location and field of view, retrieve data based on those geographical coordinates, and overlay that data over the camera view. Another application that provides location information is the Foursquare application developed by Foursquare Labs, Inc. This application can provide a message to a user regarding the location of one of the user's friends whenever the friend checks into a particular location.

What is desired is improvement to these and other types of mobile applications.

SUMMARY

In one aspect, the invention provides a system that predicts the location of an entity, such as a person (e.g., a friend of a user of a mobile device), an event, or any thing that is related to a time and place, and displays to the user this prediction information on a display screen of the mobile device. In some embodiments, the information may be displayed to the user in an augmented reality view (e.g., the prediction information may be displayed on top of an image as seen though a camera). As another example, the prediction information may be provided using a standardized feed (e.g., Really Simple Syndication (RSS)). An advantage provided by the system is that a user using the system can receive information predicting where a friend may be located at some point in the future (e.g., 30 minutes in the future) and then act on this information by, for example, planning to arrive at the predicted location at the point in time the user's friend is predicted to arrive there.

Advantageously, in some embodiments, the user can specify parameters that will limit the amount of prediction information displayed to the user so as to avoid the information overload problem. For example, the user can specify a certain area and a certain time interval such that the system will provide prediction information only for those entities (e.g., friends) that are predicted to be located within the specified area during the specified time interval. In one advantageous embodiment, the user can specify the area by specifying one or more of a location, a direction from the location, a maximum distance, and a maximum angle.

One particular aspect of the invention provides a computer implemented method for predicting the future location of an entity and for determining whether to indicate the predicted future location on a display screen of the mobile device. In some embodiments, this method includes: using a location server to determine the current location of the entity, and using the determined current location of the entity and information about the entity to predict where the entity will be located at a future point in time. The method also includes, defining an area based on: a specific location, a direction, and an angle; determining whether the predicted location falls within the defined area; and displaying, on the display screen of the mobile device, information identifying the predicted location, but the displaying step occurs if, and only if, the determining step determines that the predicted location falls within the defined area.

In some embodiments, the mobile device includes a positioning module and the method further comprises the step of determining the current location of the mobile device using the positioning module. In such embodiments, the specific location that is used to define the area is the determined current location of the mobile device.

In some embodiments, the positioning module comprises a positioning system component (e.g., GPS receiver). The mobile device may also include a direction determining module. In such embodiments, the method may also include the step of, prior to defining the area, using the direction determining module to determine a direction in which the mobile terminal is pointed and using this determined direction in defining the area.

In some embodiments, the step of displaying the information identifying the predicted location, comprises displaying the information using an augmented reality application (e.g., an augmented reality browser such as the Layar browser discussed above). In some embodiments, the mobile device comprises a camera and the step of displaying the information in an augmented reality mode includes displaying information indicating the predicted location together with an image captured from the camera.

In some embodiments, the method also includes enabling the user to specify a maximum distance variable, wherein the area is defined by the value of the maximum distance variable, the specific location, the direction and the angle.

In another aspect, the invention provides a mobile device configured to obtain and display information identifying a predicted future location of an entity. In some embodiments, the mobile device includes: a positioning module operable to determine the current location of the mobile device; a direction determining module operable to determine the direction in which the mobile device is pointed; a transmitter; a data processor; a storage system storing computer instructions; and a receiver. The computer instruction are configured to cause the data processor to: prompt a user of the mobile device input a maximum distance value; and use the transmitter to transmit a request message to a server application, wherein the request message comprises: information identifying the current location of the mobile device as determined by the positioning module; information identifying the direction in which the mobile device is pointed as determined by the direction determining module; the maximum distance value and information specifying an angle. The computer instruction may further be configured to cause the data processor to inform the user of a predicted location of the entity in response to the receiver receiving from the server application in response to the request message information identifying the predicted location.

In another aspect, the invention provides a server computer for predicting a future location of an entity. In some embodiments, the server computer includes: a data processor and a storage system storing computer instructions. Advantageously, the computer instructions are configured to cause the data processor to: use a location server to determine the current location of an entity; use the determined current location of the entity and stored information about the entity to predict where the entity will be located at a future point in time; define an area based on: a specific location, a direction, and an angle; determine whether the predicted location falls within the defined area; and transmit to a mobile device information identifying the predicted location if, and only if, the predicted location falls within the defined area.

In another aspect, the invention provides a computer program for obtaining and displaying information identifying a predicted future location of an entity. In some embodiments, the computer program comprises computer readable code means which when run an a mobile device, causes the mobile device to: prompt a user of the mobile device to input a maximum distance value; transmit a request message to a server computer, wherein the request message comprises information identifying the current location of the mobile device, information identifying a direction, a maximum distance value and information specifying an angle, and further wherein the mobile device receives from the server computer in response to the request message information identifying a predicted location of an entity, and inform the user of the predicted location.

In another aspect, the invention provides a computer program for determining a predicted future location of an entity. In some embodiments, the computer program comprises computer readable code means which when run an a server computer, causes the server computer to: predict where the entity will be located at a future point in time; define an area using information identifying the current location of a mobile device, information identifying a direction, a maximum distance value and information specifying an angle; determine whether the predicted location of the entity falls with the defined area; and transmit to the mobile device information identifying the predicted location of the entity in response to determining that the predicted location of the entity falls within the defined area.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
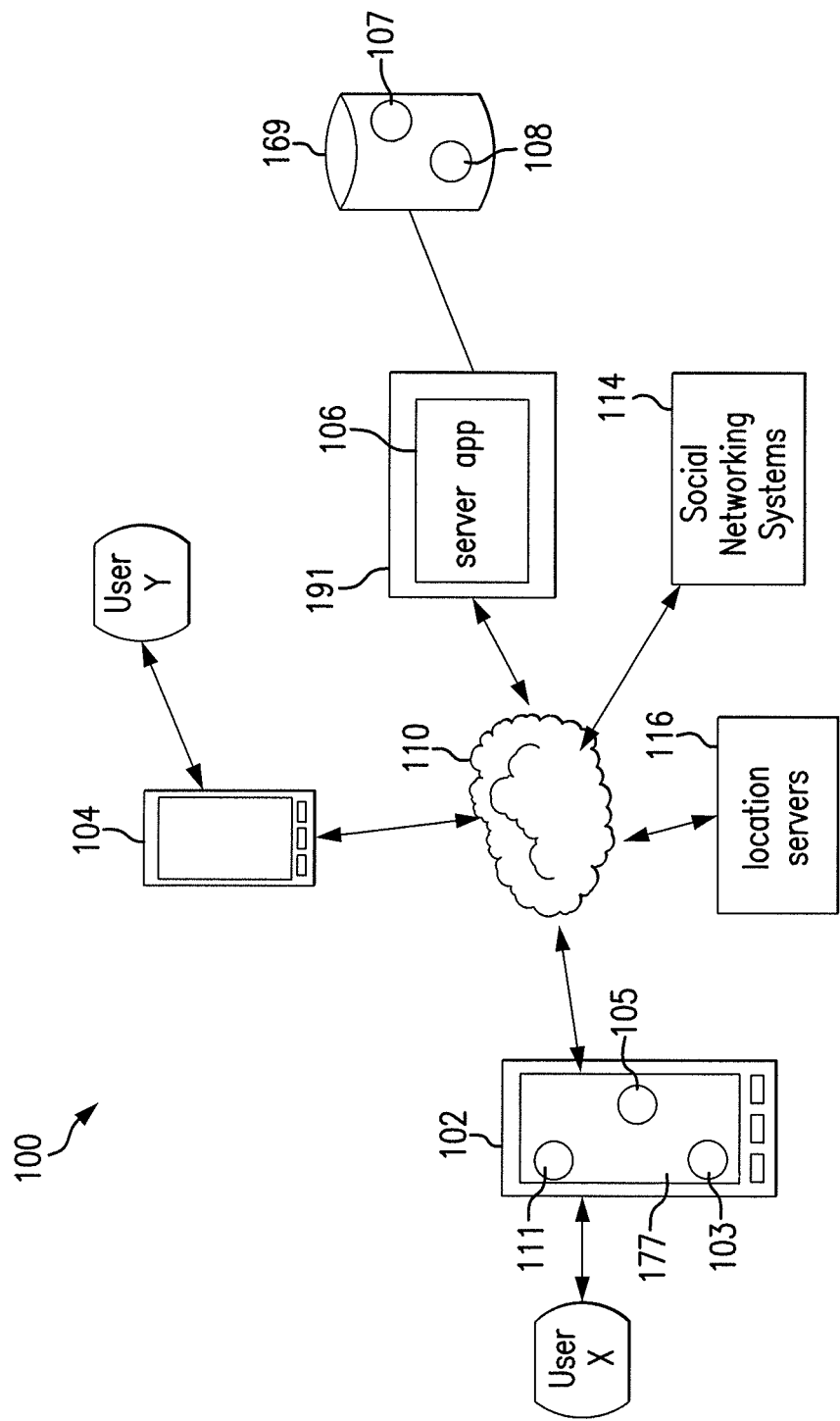
FIG. 1 illustrates a system according to an embodiment of the invention.

Referring now to FIG. 1, FIG. 1 illustrates a system 100, according to an embodiment of the invention, for providing to a user (e.g., user X) of a mobile device (e.g., device 102) information identifying a predicted future location of an entity (e.g., user Y). As used herein the term entity encompasses any thing that can have a location (e.g., a person, an animal, a physical object, a future or historical event, etc.). As shown in FIG. 1, mobile device 102 may have installed thereon a computer program 103 (e.g., a social networking application or other application, a widget, a utility, or other program) and may include a camera 111 (e.g., a lens and image sensor for receiving light focused by the lens). When user X wants to determine a predicted future location of a friend, user X can launch computer program 103. Upon or after being launched, computer program 103 may cause mobile device 102 to perform the process 200 shown in FIG. 2.

Figure 2:
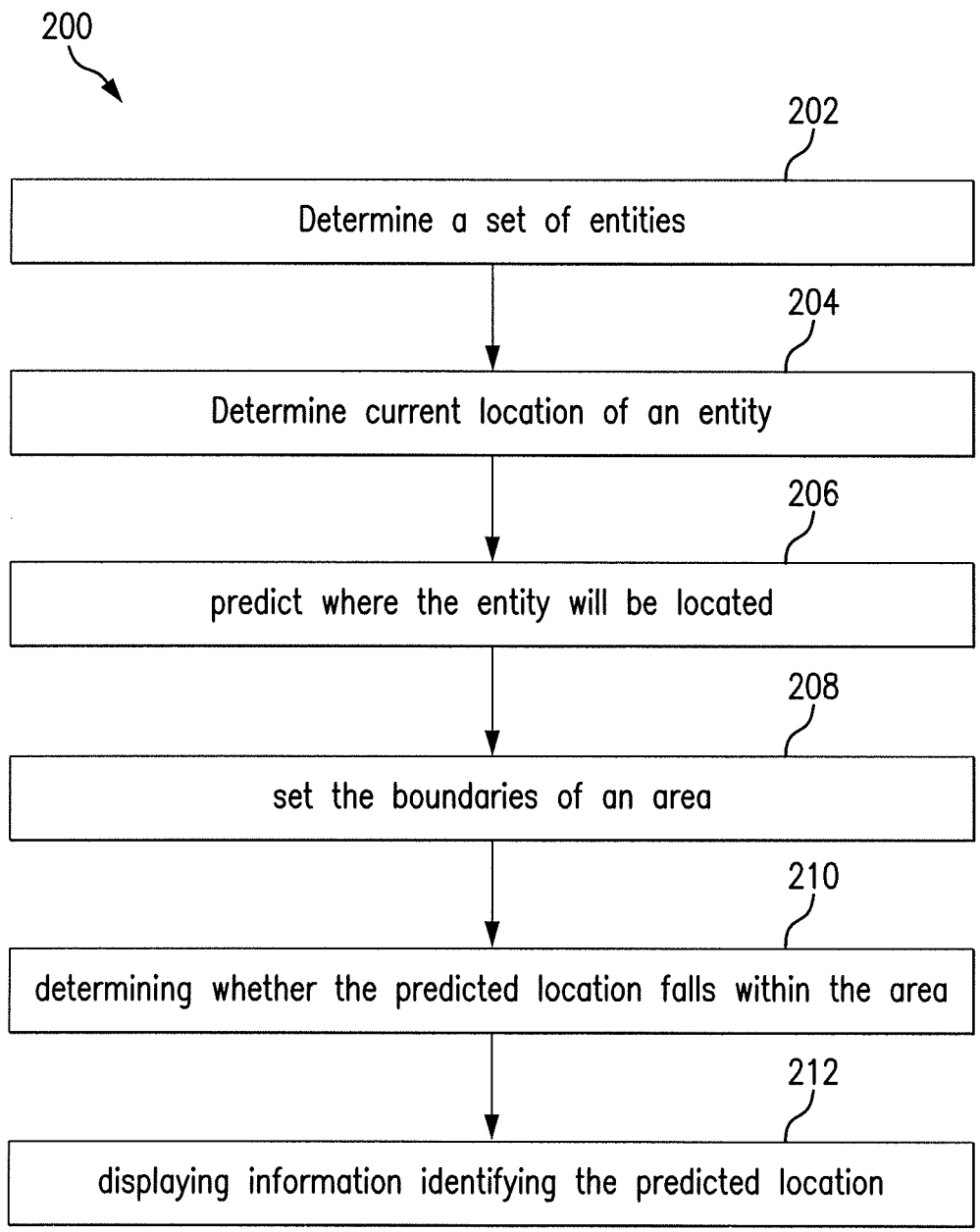
FIG. 2 is a flow chart illustrating a process according to an embodiment of the invention.

Referring now to FIG. 2, FIG. 2 is a flow chart illustrating a process 200 according to an embodiment of the invention. Process 200 may be performed by mobile device 102 under the control of computer program 103 (e.g., it may be performed in response to an input from user X) or by server computer 191 under the control of server program 106, in response to receiving a request transmitted from computer program 103, which request may include a number of parameters as described below.

Process 200 may begin in step 202, where computer program 103 causes the mobile device 102, or server program 106 causes server computer 191, to determine a set of entities. In some embodiments, the set of entities is determined based on an entity type or types selected by the user. For instance, the user may select to receive location prediction information only for friends and relatives of the user. Computer program 103 via the mobile device 102 may communicate with server program 106 via server computer 191 and/or one or more social networking systems 114 to determine a set of entities. Likewise, server program 106 may via server computer 191 communicate with one or more social networking systems 114 to determine the set of entities. For example, if user X has, for instance, a facebook account and/or a twitter account, computer program 103/server program 106 may via mobile device 102/server computer 191 communicate with a facebook server and/or a twitter server to determine information about the user's facebook friends and/or information about the people that the user follows on twitter. Thus, the set of entities determined in step 202 may include all of the user's facebook friends and/or all of the people that user X follows on twitter (or at least those facebook friends/twitter followees who have consented to allow the system to provide location information to user X). In some embodiments, before step 202 is performed user X may specify which data source (e.g., facebook and/or twitter or some other data source) to use to determine the set of entities.

In another embodiment, instead of or in addition to communicating via mobile device 102 with server program 106 and/or one or more social networking systems 114 to determine the set of entities, computer program 103 may cause the mobile device 102, or server program 106 may cause server computer 191, to retrieve identifiers (e.g., phone numbers) from a database 105 or a database 108, respectively. Database 105/108 may contain information regarding user X's contacts or may simply be a file that stores information for a set of entities user X has previously selected. For example, user X may specify to computer program 103 via mobile device 102 that the user wants to receive predicted location information for only a specific set of people and, for each person in the set, provide to computer program 103 via mobile device 102 an identifier (e.g., phone number) associated with the person. In such a case, computer program 103 via mobile device 102 may store the specified information locally in a local file (e.g., database 105) or remotely in database 108.

Next (step 204), the current location of at least one of the entities included in the set determined in step 202 is determined. For example, computer program 103/server program 106 may cause mobile device 102/server computer 191 to use a telephone number (or other identifier) associated with the entity (e.g., assigned to a device used by the entity) and a location server 116 to determine the entity's location. The entity's telephone number (or other identifier) may be obtained from database 105/108 and/or social networking system 114 in step 202. Once the identifier is obtained, the identifier may be transmitted by computer program 103/server program 106 via the mobile device 102/server computer 191 to location server 116 in a message that requests location server to use the identifier to determine the entity's location. In response to the message, location server 116 uses the identifier to determine the entity's location and transmits the determined location information to the requestor (i.e., mobile device 102/server computer 191).

The location server may be a system that acts as a broker between mobile network operators (MNOs) and service providers (SPs), such as the Ericsson Internet Payment eXchange (IPX) system. An application (e.g. computer program 103 or server program 106) communicates via a device (e.g., mobile device 102 or server computer 191) with IPX using an application programming interface (API), while IPX handles communications with the MNOs. Computer program 103 or server program 106 is able to locate a user via the IPX system. Using an IPX API, an application can get from the IPX system a user's coordinates (longitude and latitude according to the World Geodetic System (WGS 84)). IPX uses an operator's positioning system to locate a user (more specifically, a mobile device associated with the user). A mobile device can be located as long as the mobile device is switched on, has network coverage and has communicated with the network. The positioning of the device may be accomplished in different ways, depending on the operator (e.g., based on cell ID, based on timing advance, triangulation).

Next (step 206), computer program 103/server program 106 cause mobile device 102/server computer 191 to use the determined location of the entity and information about the entity to make predictions as to where the entity will be located at one or more future points in time. The information about the entity that is used to make the future location prediction may be historic information and/or real-time information. The historic information (which may be contained in database 107 that is stored on a storage system 169) may include information identifying, for example, locations where the entity has been located in the past, the entity's home address, the location where the entity works, places (e.g., cafes, restaurants, bars, friends' homes) that the entity frequently visits. The real-time information may include information identifying, for example, the direction in which the entity is moving, the speed at which the entity is moving, and the location of other entities (e.g., other friends) that are within a certain distance of the entity.

In step 208 (which step may occur before any of the above described steps), computer program 103/server program 106 cause mobile device 102/server computer 191 to define an area based on: (1) a specific location (e.g., the current location of user X or a location where user X will be at some point in the future), (2) a direction, and (3) an angle. The direction and angle parameters may be provided to server program 106 from computer program 103 in the request described above.

Figure 3:
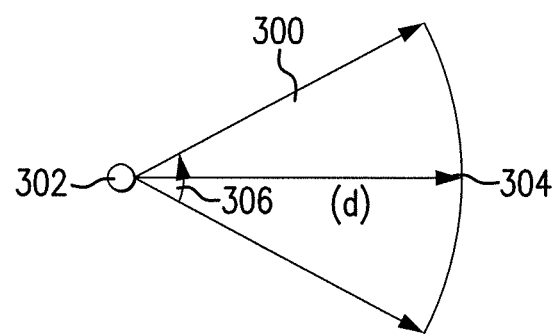
FIG. 3 illustrates an example area defined by a direction, a location, a distance and an angle.

FIG. 3 illustrates an exemplary area 300 that is defined by a specific location 302, a direction 304 (i.e., East) from the specific location, and an angle 306 (e.g, 90 degrees or some other angle less than 360 degrees). In the example shown, the area is defined such that direction 304 bisects the angle. As also shown in FIG. 3, in some embodiments, the area is further defined by a distance (d). As mentioned above, the "specific location" may be the current location of user X (e.g., the current location of mobile device 102). In some embodiments, mobile device 102 is equipped with a positioning module 505 (which may include a positioning system component 569, such as, for example, a Global Positioning System (GPS) receiver or other positioning system component or software that can communicate with location server 116) that is capable of providing to computer program 103/server program 106 via mobile device 102/server computer 191 user X's current location. In some embodiments, the positioning module is an integral component of computer program 103.

In step 210, computer program 103/server program 106 causes mobile device 102/server computer 191 to determine whether a predicted location determined in step 206 falls within the defined area. In some embodiments, each of the predicted locations determined in step 206 may have an associated probability value that identifies how probable is the prediction (e.g., some predictions may be more probably than others). In such embodiments, prior to performing step 210, computer program 103/server program 106 may cause mobile device 102/server computer 191 to compare the probability value associated with a prediction to a threshold to determine whether the probability value meets or exceeds the threshold, and computer program 103/server program 106 only perform step 210 for those predictions that exceed the threshold. The threshold value may be set by the user.

In step 212, computer program 103/server program 106 causes mobile device 102/server computer 191 to display, on a display screen 177 of the mobile device 102, information identifying the predicted location. Advantageously, in some embodiments, the displaying step is performed if, and only if, it was determined that the predicted location falls within the defined area.

In some embodiments, server program 106 causes server computer 191 to perform the displaying step merely by transmitting to computer program 103 via mobile device 102 a certain message containing information identifying the predicted location (e.g., a message containing the coordinates of the predicted location), which message causes computer program 103 to cause mobile device 102 to display on the display screen 177 the information identifying the predicted location. The displayed information could be, for example, the coordinates themselves, an indicator (e.g., a circle, a dot, an icon, the name of the entity or any combination thereof) displayed on top of a map, and/or an address. Additionally, in some embodiments, the information may be displayed in an augmented reality view. For example, the displayed information could be an indicator displayed on top of an image captured by the camera 111 where the indicator is positioned on top of the image at a location corresponding to the predicted location.

Figure 4:
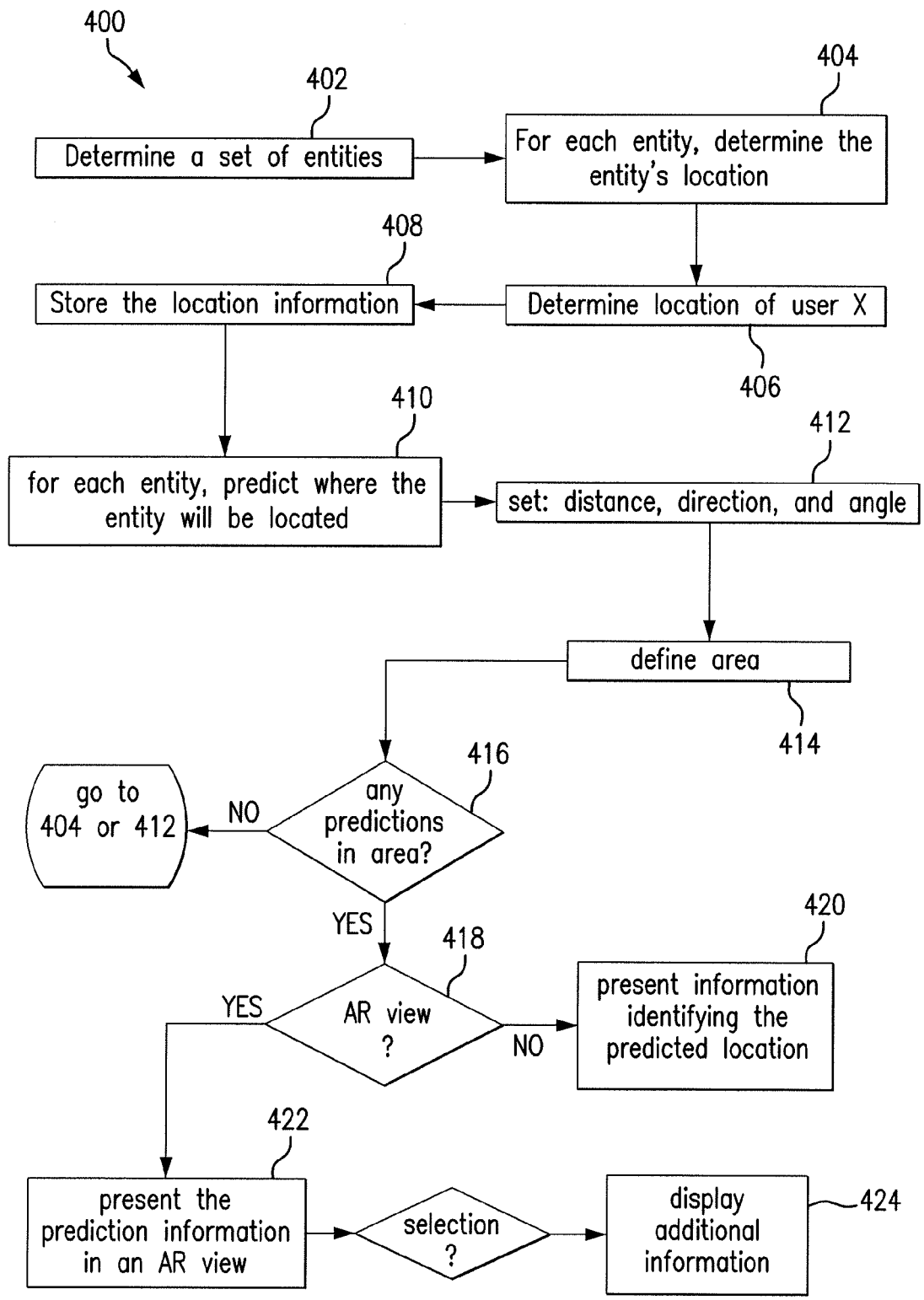
FIG. 4 is a flow chart illustrating a process according to an embodiment of the invention.

Referring now to FIG. 4, FIG. 4 is a flow chart illustrating a more detailed process 400 according to an embodiment of the invention. Process 400 may be performed by mobile device 102 executing computer program 103 (e.g., it may be performed in response to an input from user X) or by server computer 191 executing server program 106 in response to receiving a request transmitted from computer program 103.

Process 400 may being in step 402, where computer program 103 or server program 106 cause mobile device 102 or server computer 191, respectively, to determine a set of entities (see step 202 above). In step 404, for each entity in the set, mobile device 102 or server computer 191 determines the current location of the entity. In step 406, mobile device 102 or server computer 191 determines the current location of user X. In step 408, mobile device 102 or server computer 191 stores the current location information determined in steps 404 and 406 in a database 107 containing historical location data.

In step 410, for each entity in the set, mobile device 102 or server computer 191 predicts where the entity will be located at one or more future points in time. The one or more future points in time may be one or more user specified points in time. For example, prior to step 402, user X may be prompted to input a future time range (e.g., 1 to 2 hours in the future).

In step 412, user X defines one or more of: a maximum distance, a desired direction, a maximum angle, an entity type (e.g., friend, relative, colleague or event), or other parameter. For example, in step 412, user X may be prompted by mobile device 102 or server computer 191 to input values for one or more of the max distance, direction, and max angle using a keyboard (e.g., a virtual keyboard). In some embodiments, one or more of the above parameters may be obtained from a predefined setting or profile instead of being obtained directly from the user. In some embodiments, user X can define the desired direction simply by pointing device 102 in the desired direction. In such embodiments, device 102 includes a direction determining module 567 (see FIG. 5) (which may include a compass 579, a magnetometer or other device for determining direction) so that the programs on device 102 can obtain information identifying the direction in which device 102 is pointed. In some embodiments, user X can define the desired angle simply by pointing device in a first direction and then pointing the device in a second direction. In this case, the angle will be the angle between the two directions. Alternatively, the angle could be determined as a function of the angle of view of camera 111. For example, the angle could be set equal to the angle of view of camera 111, which may be a function of the focal length of the lens of camera 111 and the size of the image sensor of camera 111.

In step 414, mobile device 102 or server computer 191 defines an area based on the distance, angle and directions parameters and also based on either the current location of user X and/or a future location for user X (see e.g., step 208 above).

In step 416, mobile device 102 or server computer 191 determine whether any of the locations predicted in step 410 fall within the defined area. If none of the locations fall with the defined area, then the process may go back to step 404 or back to step 412 so that the user could expand the search (e.g., increase max distance, change the entity type, etc.). In some embodiments, instead of the user expanding the search, mobile device 102 or server computer 191 could automatically expand the search. If at least some threshold number of the locations fall with the defined area (e.g., one or more), then the process proceeds to step 418.

In step 418, mobile device 102 or server computer 191 determines whether an augmented view should be used to display to user X the predicted location information. If not, the process may proceed to step 420, otherwise it may proceed to step 422.

In step 420, for one or more of the predicted locations that fall within the defined area, information (e.g., data in a text format) identifying the predicted location and the entity associated with the predicted location is presented to the user X by mobile device 102 or server computer 191. Other information may also be presented, such as, information identifying the direction the entity is travelling, information identifying the time period during which the entity is expected to be at the predicted location, the speed at which the entity is currently traveling, information identifying the accuracy of the prediction, the current distance between the entity and user X.

For example, in step 420, if server program 106 determined the predicted locations, server program 106 may use server computer 191 to provide to computer program 103 via mobile device 102 an RSS or XML feed containing the prediction information. In such a scenario, computer program 103 could be any software that can display content from an RSS or XML feed (e.g., the SonyEricsson Timescape user interface).

In step 422, for one or more of the predicted locations that fall within the defined area, information is drawn on the screen in an augmented reality view by mobile device 102 or server computer 191. For example, as described above, for each predicted location that falls within the defined area, an indicator (e.g., an entity identifier—such as the entity's name) may displayed on top of an image captured by the camera 111 where the indicator is positioned on top of the image at a location corresponding to the predicted location. Along with each indicator, other information may also be displayed on top of the image, such as, information identifying the direction the entity is travelling, information identifying the time period during which the entity is expected to be at the predicted location, the speed at which the entity is currently traveling, information identifying the accuracy of the prediction, the current distance between the entity and user X.

In step 424, if user X selects (e.g., "clicks on") one of the indicators, then additional information regarding the entity associated with the indicator is displayed by mobile device 102 or server computer 191. This additional information may be a profile (or part of a profile) for the entity (e.g., the entity's profile picture) that was pulled from a social networking system 114 or some other database.

Figure 5:
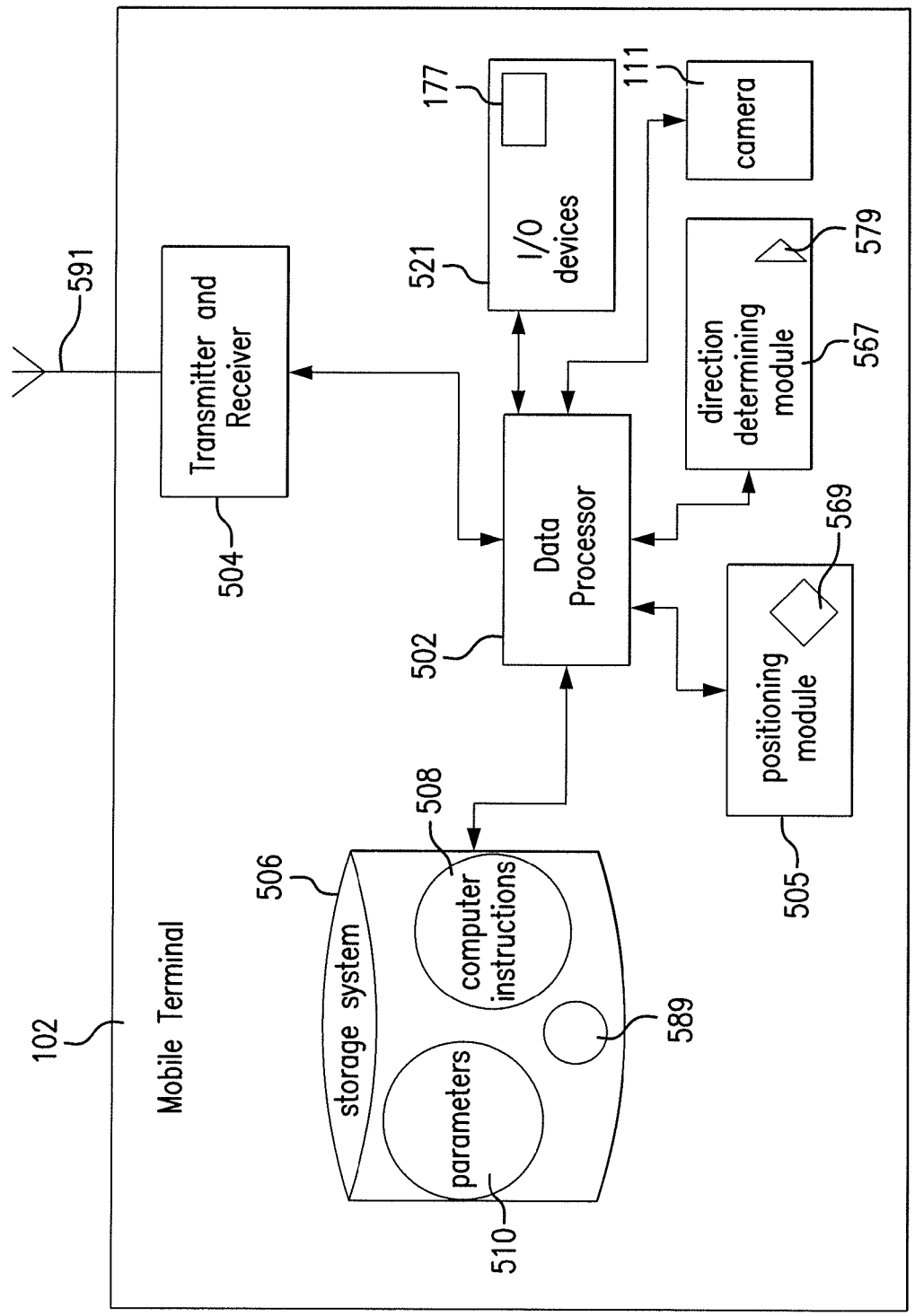
FIG. 5 is a block diagram of a mobile device according to some embodiments.

Referring now to FIG. 5, FIG. 5 illustrates a block diagram of mobile device 102 according to some embodiments of the invention. As shown in FIG. 5, device 102 may include: a data processor 502, which may include one or more microprocessors and/or one or more circuits, such as an application specific integrated circuit (ASIC), Field-programmable gate arrays (FPGAs), etc; a transmitter and a receiver 504 coupled to an antenna 591 for wireless communications; a positioning module 505, which may include a positioning system component 569, such as, for example, a Global Positioning System (GPS) receiver or a GLONASS (Global Navigation Satellite System) receiver; direction determining module 567; input/out devices 521 (e.g., a keyboard and display screen 177); a storage system 506, which may include one or more non-volatile storage devices and/or one or more volatile storage devices (e.g., random access memory (RAM)). Satellite based positioning systems that are expected to be operable soon are also conceivable as additional or alternative positioning modules, i.e. the positioning module 505 may be or comprise a GALILEO receiver or a COMPASS receiver. In embodiments where data processor 502 includes a microprocessor, computer instructions 508 (i.e., computer readable code means) and an augmented reality application 589 may be stored in storage system 506. Configuration parameters 510 for defining an area (e.g., an angle value, a maximum distance value) may also be stored. The computer instructions 508 may be embodied in a computer program stored using a computer readable means, such as, but not limited, to magnetic media (e.g., a hard disk), optical media (e.g., a DVD), memory devices (e.g., random access memory), etc. In some embodiments, computer instructions 508 are configured such that when computer instructions 508 are executed, computer instructions 508 cause mobile device 102 to perform steps described above (e.g., steps describe above with reference to the flow charts shown in FIGS. 2 and 4). That is, for example, computer instructions 508 implement computer program 103. In other embodiments, mobile device 102 is configured to perform steps described above without the need for computer instructions 508. That is, for example, data processor 502 may consist merely of one or more ASICs. Hence, the features of the present invention described above may be implemented in hardware and/or software.

Figure 6:
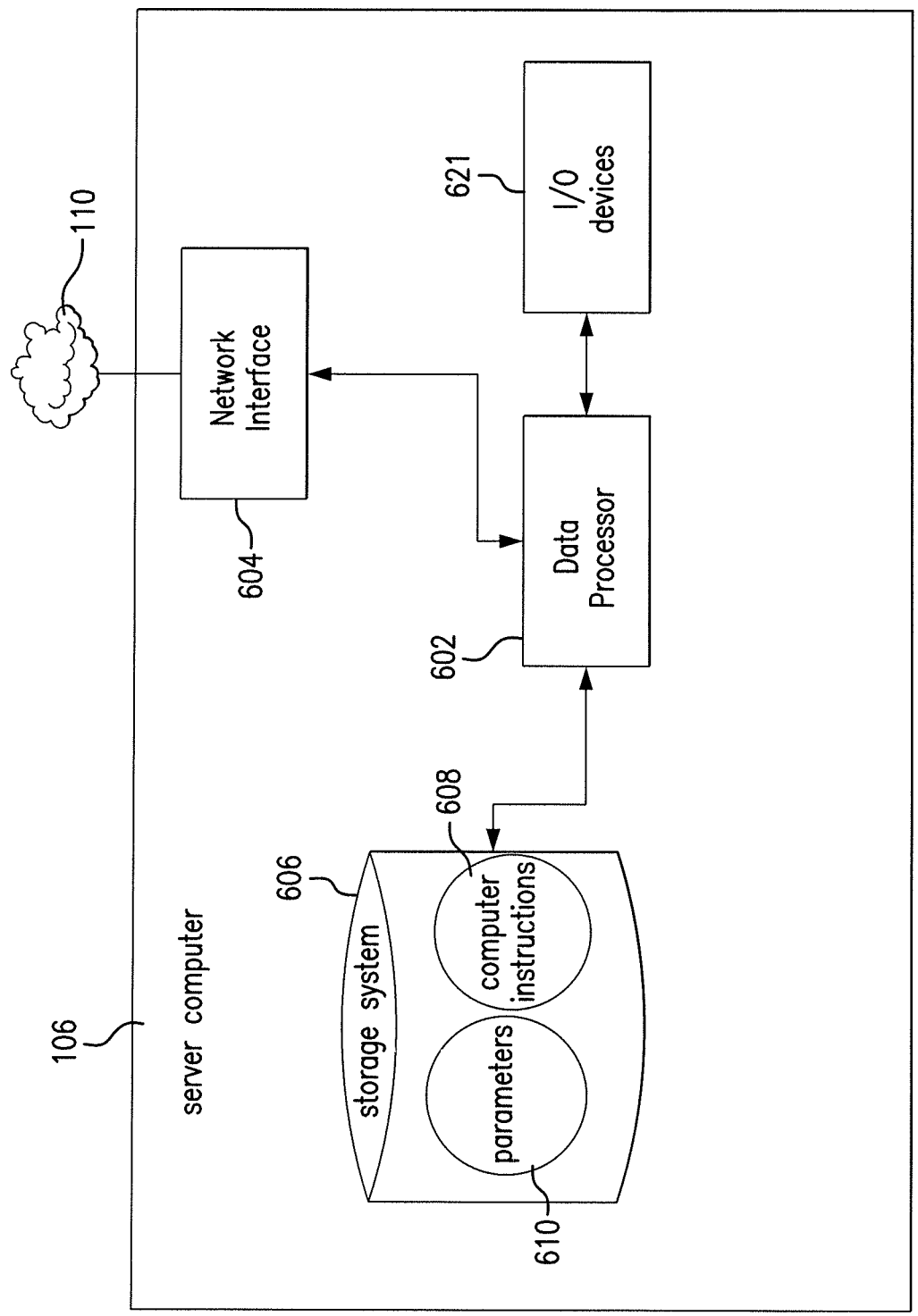
FIG. 6 is a block diagram of a server computer according to some embodiments.

Referring now to FIG. 6, FIG. 6 illustrates a block diagram of server computer 191 according to some embodiments of the invention. As shown in FIG. 6, computer 191 may include: a data processor 602, which may include one or more microprocessors and/or one or more circuits, such as an application specific integrated circuit (ASIC), Field-programmable gate arrays (FPGAs), etc; a network interface 604 for interfacing with network 110; input/out devices 621 (e.g., a keyboard and display screen); a storage system 606, which may include one or more non-volatile storage devices and/or one or more volatile storage devices (e.g., random access memory (RAM)). In embodiments where data processor 602 includes a microprocessor, computer instructions 608 (i.e., computer readable code means) may be stored in storage system 606. Configuration parameters 610 for defining an area (e.g., an angle value, a maximum distance value) may also be stored. The computer instructions 608 may be embodied in a computer program stored using a computer readable means, such as, but not limited, to magnetic media (e.g., a hard disk), optical media (e.g., a DVD), memory devices (e.g., random access memory), etc. In some embodiments, computer instructions 608 are configured such that when computer instructions 608 are executed they cause computer 191 to perform steps described above (e.g., steps describe above with reference to the flow charts shown in FIGS. 2 and 4). That is, for example, computer instructions 608 implement server program 106. In other embodiments, computer 191 is configured to perform steps described above without the need for computer instructions 608. That is, for example, data processor 602 may consist merely of one or more ASICs. Hence, the features of the present invention described above may be implemented in hardware and/or software.

EXAMPLE 1

In this example, the Timescape application is installed on device 102 and user X starts the Timescape application. After starting the application, the user configures the location prediction module of the application by setting an angle, a direction, a distance, and a time period (e.g., current time to 1 hour in future). The application defines an area based on the configuration parameters input by the user. Additionally, the application, in response to predicting, with at least some threshold degree of certainty, that a friend of user X (e.g., a Facebook friend) will be located within the defined area within the defined time period, provides a notification to user X (e.g., causes device 102 to beep and/or displays information on the display screen 177 of device 102 regarding the prediction, such as the name of the friend, where the friend is predicted to be located within the area, and the time at which the friend is predicted to be at that location).

EXAMPLE 2

A user, Carol, is using the application and finds out that in about 3 hours there is a high probability that Elle magazine will have a cover photo shoot in Central Park just 250 meters 90 degrees east of where Carol is currently standing. She thinks that it sounds interesting, but would not like to wait, so she bookmarks the notification for later. 2.5 hours later the application reminds Carol of the event and by using the direction determining module 567 (which may include a compass 579) in the application and the built in map, Carol can navigate her way back to the photo shoot. On the way back the application continuously notifies Carol about the remaining distance and the predicted time left to the start.

EXAMPLE 3

A user, Steven, is standing on Leicester Square in London and is notified that one of Steve's favorite bands will be putting on a show in 2 hours at a pub that is less than a mile away from Steve's current position.

EXAMPLE 4

Steven is pointing device 102 in the direction of a Haagen Dazs ice cream store and learns that his friend John visited the store three times yesterday afternoon. This can be displayed as a textual description or maybe as a transparency of an avatar where the more times John has been at a certain place the brighter and more contrast his avatar has.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. In an environment comprising a mobile device, a location server, and a storage system storing information about an entity, a computer implemented method for predicting the future location of the entity and for determining whether to indicate the predicted future location on a display screen of the mobile device, comprising:
   using the location server, determining the current location of the entity;
   using the determined current location of the entity and the stored information about the entity to predict where the entity will be located at a future point in time;
   defining an area associated with a selected location of a user of the mobile device based on: a specific location, a direction, and an angle;
   determining whether the predicted location falls within the defined area; and
   displaying, on the display screen of the mobile device, information identifying the predicted location if the determining step determines that the predicted location falls within the defined area.

2. The method of claim 1, wherein
   the mobile device includes a positioning module;
   the method further comprises the step of determining the current location of the mobile device using the positioning module, and
   the specific location is the determined current location of the mobile device.

3. The method of claim 2, wherein the positioning module comprises a positioning system component.

4. The method of claim 1, wherein the mobile device comprises a direction determining module, and the method further comprises the step of, prior to defining the area, using the direction determining module to determine the direction.

5. The method of claim 4, wherein the direction determining module comprises a compass.

6. The method of claim 1, wherein the step of displaying the information identifying the predicted location, comprises displaying said information using an augmented reality application.

7. The method of claim 6, wherein the mobile device comprises a camera and the step of displaying said information in an augmented reality mode comprises displaying information indicating the predicted location together with an image captured from the camera.

8. The method of claim 6, wherein the augmented reality application is an augmented reality browser.

9. The method of claim 1, further comprising enabling the user to specify a maximum distance variable.

10. The method of claim 9, wherein the area is defined by the value of the maximum distance variable, the specific location, the direction and the angle.

11. The method of claim 1, wherein the angle is less than 360 degrees.

12. The method of claim 11, wherein the angle is about 90 degrees.

13. A mobile device configured to obtain and display information identifying a predicted future location of an entity, comprising:
a positioning module operable to determine the current location of the mobile device;
a direction determining module operable to determine the direction in which the mobile device is pointed;
a transmitter;
a data processor;
a storage system storing computer instructions, wherein the computer instructions are configured to cause the data processor to:
prompt a user of the mobile device to input a maximum distance value; and
use the transmitter to transmit a request message to a server application, wherein the request message comprises: information identifying the current location of the mobile device as determined by the positioning module; information identifying the direction in which the mobile device is pointed as determined by the direction determining module; and the maximum distance value and information specifying an angle; and
a receiver for receiving from the server application in response to the request message information identifying a predicted location of an entity, wherein
the computer instructions are further configured to cause the data processor to inform the user of the predicted location.

14. The mobile device of claim 13, wherein the positioning module comprises a positioning system component.

15. The mobile device of claim 13, wherein
the mobile device further comprises a camera and a display screen, and
the computer instruction are configured to cause the data processor to inform the user of the predicted location by causing the data processor to display on the display screen an image captured by the camera and to display on top of the image an indicator, wherein the indicator is positioned on top of the image at a location corresponding to the predicted location of the entity.

16. The mobile device of claim 15, wherein the computer instruction are further configured to cause the data processor to display information about the entity in response to the user selecting the displayed indicator.

17. The mobile device of claim 13, wherein
the mobile device further comprises a camera, and
the angle corresponds to the field of view of the camera.

18. A server computer for predicting a future location of an entity, comprising:
a data processor;
a non-transitory computer readable medium storing computer instructions, wherein the computer instructions are configured to cause the data processor to:
use a location server to determine the current location of an entity of a type that matches an entity type selected by a user of a mobile device;
use the determined current location of the entity and stored information about the entity to predict where the entity will be located at a future point in time;
define an area associated with a selected location of a user of the mobile device based on: a specific location, a direction, and an angle;
determine whether the predicted location falls within the defined area; and
transmit to the mobile device information identifying the predicted location if the predicted location falls within the defined area.

19. The server computer of claim 18, further comprising a network interface for receiving a request message transmitted from the mobile device, wherein
the computer instructions are configured to cause the data processor to obtain from a social networking system information identifying a set of entities associated with the user of the mobile device in response to the request message.

20. The server computer of claim 19, wherein the computer instructions are configured to cause the data processor to
use the location server to attempt to determine the current location of each of the entities; and
for each entity for which the data processor is able to determine the entity's current location, use the determined current location of the entity and stored information about the entity to predict where the entity will be located at a future point in time.

21. A non-transitory computer readable medium storing a computer program for obtaining and displaying information identifying a predicted future location of an entity, comprising computer readable code which when run an a mobile device, causes the mobile device to:
prompt a user of the mobile device to input a maximum distance value;
transmit a request message to a server computer, wherein the request message comprises information identifying the current location of the mobile device, information identifying a direction, a maximum distance value and information specifying an angle, and further wherein the mobile device receives from the server computer in response to the request message information identifying a predicted location of an entity, and
inform the user of the predicted location.

22. A non-transitory computer readable medium storing a computer program for determining a predicted future location of an entity, comprising computer readable code means which when run on a server computer, causes the server computer to:

predict where the entity will be located at a future point in time;

define an area associated with a selected location of a user of a mobile device using information identifying the current location of the mobile device, information identifying a direction, a maximum distance value and information specifying an angle;

determine whether the predicted location of the entity falls with the defined area; and transmit to the mobile device information identifying the predicted location of the entity in response to determining that the predicted location of the entity falls within the defined area.

\* \* \* \* \*

UNITED STATES PATENT AND TRADEMARK OFFICE
CERTIFICATE OF CORRECTION

PATENT NO. : 8,639,803 B2  
APPLICATION NO. : 12/873771  
DATED : January 28, 2014  
INVENTOR(S) : Moritz et al.

Page 1 of 1

It is certified that error appears in the above-identified patent and that said Letters Patent is hereby corrected as shown below:

In the Specification

In Column 1, Line 46, delete "seen though" and insert -- seen through --, therefor.

In Column 3, Line 15, delete "run an a" and insert -- run on a --, therefor.

In Column 3, Line 28, delete "run an a" and insert -- run on a --, therefor.

In Column 10, Lines 18-19, delete "Haagen Dazs" and insert -- Häagen Dazs --, therefor.

In the Claims

In Column 12, Line 51, in Claim 21, delete "run an a" and insert -- run on a --, therefor.

Signed and Sealed this  
Eleventh Day of November, 2014

Michelle K. Lee  
*Deputy Director of the United States Patent and Trademark Office*